Feb. 26, 1929.
L. W. SCHMIDT
MILK STOOL AND PAIL HOLDER
Filed Aug. 20, 1928
1,703,547
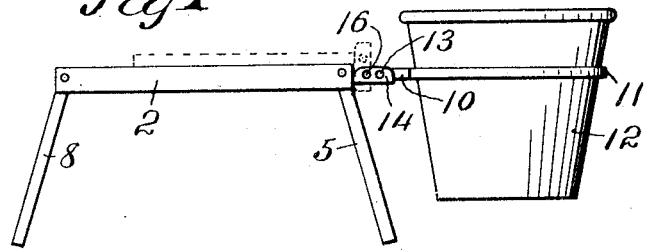
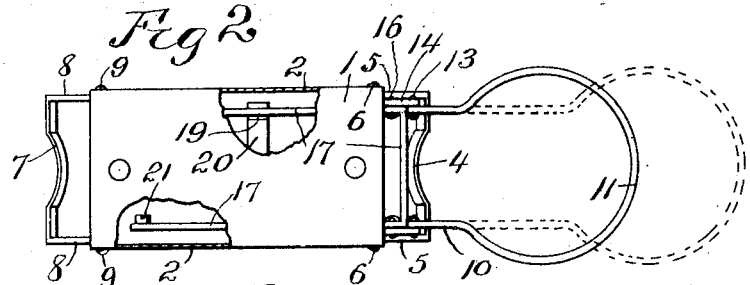
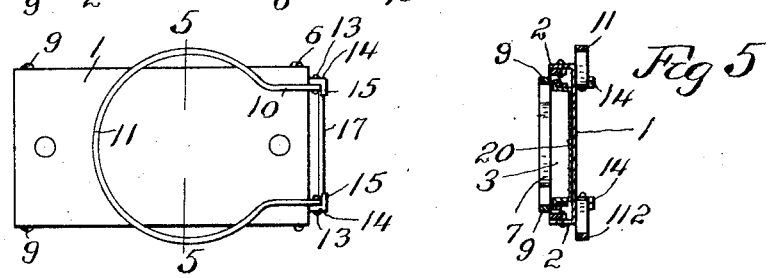
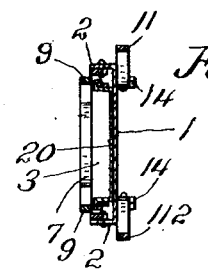
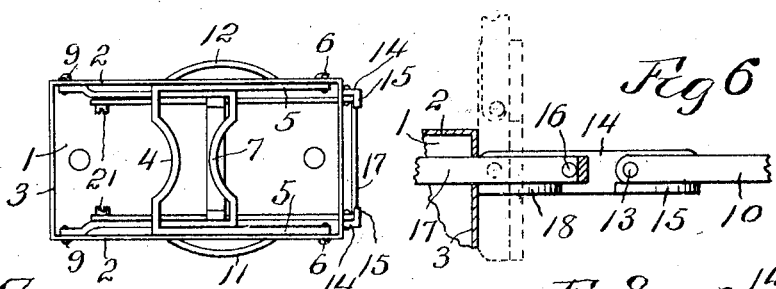
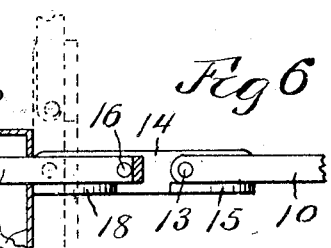
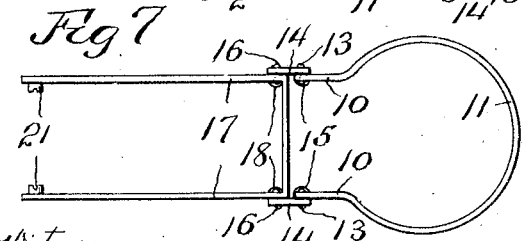
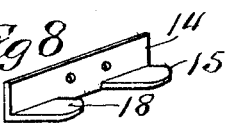
INVENTOR.
Louis W. Schmidt,
BY Warren D. House.
His ATTORNEY.
Witness
H. Vernon Olsen Patented Feb. 26, 1929.

1,703,547

UNITED STATES PATENT OFFICE.

LOUIS W. SCHMIDT, OF KANSAS CITY, MISSOURI.

MILK STOOL AND PAIL HOLDER.

Application filed August 20, 1928. Serial No. 300,722.

My invention relates to improvements in milk stools and pail holders.

One of the objects of my invention is to provide a novel milk stool and pail holder, which is simple, cheap, durable, not likely to get out of order, which permits of a ready and quick adjustment of the milk pail, and which, when not in use, can be folded into compact space for storing or shipment.

The novel features of my invention are hereinafter fully described and claimed.

In the accompanying drawing, which illustrates the preferred embodiment of my invention, Fig. 1 is a side elevation of my improved milk stool and pail holder, shown in its operative position and supporting a milk pail.

Fig. 2 is a top view of the same, partly broken away, the pail being removed.

Fig. 3 is a top view of the stool and pail holder, shown collapsed to its folded position.

Fig. 4 is a bottom view of what is shown in Fig. 3.

Fig. 5 is a section on the line 5—5 of Fig. 3.

Fig. 6 is an enlarged vertical sectional view of a corner portion of the seat and parts connected therewith.

Fig. 7 is a plan view of the milk pail holding members, shown extended.

Fig. 8 is an enlarged perspective view of one of the hinge members which connect the pail supporting member with its U shaped support.

Similar reference characters designate similar parts in the different views.

The stool is provided with a seat, which, as shown, may comprise a rectangular flat horizontal body 1 from the edges of which depend side flanges 2 and end flanges 3.

For supporting the seat, there are provided two U shaped legs, the front leg comprising a transverse portion 4 and two arms 5, which are respectively pivoted on a transverse horizontal axis by bolts 6, which extend respectively through the side flanges 2, adjacent to the front ends thereof, and the rear leg comprising a transverse portion 7 and arms 8, the latter being pivoted on a horizontal axis by means of two bolts 9 which extend respectively through the side flanges 2 adjacent to the rear ends thereof.

The legs are adapted to be swung from the outwardly inclined supporting positions, shown in Fig. 1 to the folded positions between the flanges 2, as shown in Fig. 4.

10 designates a U shaped pail supporting member having an arcuate portion 11 adapted to receive and serve as a seat for a milk pail 12. The arms of the member 10 are respectively pivoted on a horizontal axis by bolts 13 to the vertical flanges 14 of two hinge members, each of which has on its inner side and lower edge an inwardly extending lip 15 for supporting and limiting the downwardly swinging of the member 10 to the horizontal.

Each hinge member 14 is pivoted by a horizontal bolt 16 to one of the two arms of a U shaped horizontal supporting member 17, the arms of which are respectively longitudinally slidable in slots provided therefor in the front end flange 3.

The hinge members 14 are also provided each with an inwardly extending lip 18, which engages the under edge of the adjacent arm of the member 17, for limiting the downward swinging of the hinge member, Fig. 6.

The arms of the U shaped slidable member 17 extend under the body 1 of the seat and are respectively slidably mounted in two channels 19 formed at the lower ends of two arms of a U shaped member the transverse portion 20 of which is fastened to the under side of the body 1 transversely thereto, Figs. 2, 4 and 5.

Mounted respectively in the arms of the U shaped member 17, adjacent to the rear ends of said arms, and projecting inwardly therefrom, are two screws 21, which are adapted to engage the arms of the member 20 for limiting the outward sliding of the member 17, Fig. 4.

In the operation of my invention, the leg members are swung to the positions shown in Fig. 1, in which positions the arms 5 and 8 respectively strike the end flanges 3, which hold the leg members from further outward swinging.

The pail supporting member 10 is then swung to the horizontal forwardly extending position, shown in solid lines in Fig. 1, and the milk pail is mounted in the seat portion 11 of the member 10. The milk man or maid then sits on the seat, and adjusts the pail 12, with the members 10, hinges 14 and supporting member 17, horizontally to suit the position occupied by the cow that is being milked.

After the milking operation has been finished, the pail 12 is removed, and the member 10 swung on the hinges 14 to the horizontal position across and parallel with the body 1 of the seat, the member 17 being slid rearwardly to the positions shown in dotted lines in Fig. 1 and in solid lines in Fig. 4.

The legs are then swung to the folded positions shown in Fig. 4. The device will, thus be in compact form for storing or shipment.

I do not limit my invention to the structure shown and described, as many modifications, within the scope of the appended claims, may be made without departing from the spirit of my invention.

What I claim is:—

1. In a milk stool and pail holder, a seat, supporting means therefor, a member adapted to support a pail, and means on said seat pivotally supporting said member on a horizontal axis by which said member can be swung from an operative position extending horizontally from said seat to a folded position across and parallel with said seat.

2. In a milk stool and pail holder, a seat, supporting means therefor, a member adapted to support a pail, and means horizontally slidable on said seat pivotally supporting said member on a horizontal axis by which said member can be moved toward and from said seat and swung from an operative position extending horizontally from said seat to a folded position across and parallel with said seat.

3. In a milk stool and pail holder, a seat, legs pivoted thereto so as to be swung from a downwardly extending supporting position to a position parallel with said seat, a member adapted to support a pail, and means on said seat pivotally supporting said member on a horizontal axis by which said member can be swung from an operative position extending horizontally from said seat to a folded position across and parallel with said seat.

4. In a milk stool and pail holder, a seat, legs pivoted thereto so as to be swung from a downwardly extending supporting position to a position parallel with said seat, a member adapted to support a pail, and means horizontally slidable on said seat pivotally supporting said member on a horizontal axis by which said member can be moved toward and from said seat and swung from an operative position extending horizontally from said seat to a folded position across and parallel with said seat.

5. In a milk stool and pail holder, a seat, a U shaped member the arms of which are horizontally slidably supported by said seat, means for supporting said seat, a pail supporting U shaped member the arms of which are horizontally disposed, and means pivotally supporting the arms of the pail supporting member on a horizontal axis on the arms respectively of said slidable member, whereby the pail supporting member may be swung from a horizontal position extending from said seat to a horizontal position extending across and parallel with said seat.

6. In a milk stool and pail holder, a seat, legs pivoted thereto so as to be swung from a downwardly extending supporting position to a folded position parallel with said seat, a supporting member horizontally slidable on said seat, a U shaped member having means adapted to support a pail, and means pivotally connecting the arms of said U shaped member to said slidable member by which the U shaped member may be swung from a position extending horizontally from said seat to a folded position across and parallel with said seat.

7. In a milk stool and pail holder, a seat, supporting means therefor, a supporting member horizontally slidable on said seat, a U shaped member having means adapted to support a pail, and two hinge members pivoted on a horizontal axis to said slidable member and respectively pivoted to the arms of said U shaped member, whereby the latter may be swung from a horizontal position extending from said seat to a horizontal folded position across and parallel with said seat, said hinge members having means for engaging and limiting the downward swinging of said arms and having means engaging said slidable member by which the downward swinging of said hinge members on said slidable member may be limited.

In testimony whereof I have signed my name to this specification.

LOUIS W. SCHMIDT.